United States Patent
D'Souza et al.

(10) Patent No.: US 11,238,020 B2
(45) Date of Patent: Feb. 1, 2022

(54) MAINTAINING TEMPORAL ASSOCIATIONS FOR EVENT DATA IN AN EVENT DATABASE

(71) Applicant: EMC IP Holding Company LLC, Hopkinton, MA (US)

(72) Inventors: Aldrin D'Souza, Herndon, VA (US); Kevin T. Douglas, Vienna, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 16/587,635

(22) Filed: Sep. 30, 2019

(65) Prior Publication Data

US 2021/0097042 A1    Apr. 1, 2021

(51) Int. Cl.
*G06F 16/30*    (2019.01)
*G06F 16/22*    (2019.01)
*G06F 16/2458*    (2019.01)

(52) U.S. Cl.
CPC .......... *G06F 16/22* (2019.01); *G06F 16/2477* (2019.01)

(58) Field of Classification Search
CPC .. G06F 16/22; G06F 16/2477; G06F 16/2471; G06F 16/248; G06F 16/24535; G06F 16/1744; G06F 16/258
USPC ........ 707/609, 687, 705, 769, 790, 813, 821
See application file for complete search history.

(56) References Cited

U.S. PATENT DOCUMENTS

| | | | | |
|---|---|---|---|---|
| 5,899,988 | A * | 5/1999 | Depledge | G06F 16/22 |
| 10,705,695 | B1 * | 7/2020 | Porath | G06F 16/248 |
| 10,810,314 | B1 * | 10/2020 | Marotz | G06F 21/6218 |
| 2003/0204444 | A1 * | 10/2003 | Van Luchene | G06Q 30/02 705/16 |
| 2005/0055385 | A1 | 3/2005 | Sinha et al. | |
| 2008/0082585 | A1 * | 4/2008 | Elgezabal | G06F 21/64 |
| 2009/0182701 | A1 | 7/2009 | Berger et al. | |
| 2009/0182779 | A1 | 7/2009 | Johnson | |
| 2010/0235330 | A1 | 9/2010 | Reiner | |
| 2019/0095508 | A1 * | 3/2019 | Porath | G06F 16/2471 |

OTHER PUBLICATIONS

J. R. Driscoll et al., "Making Data Structures Persistent," Journal of Computer and System Sciences, Feb. 1989, pp. 86-123, vol. 38, No. 1.

* cited by examiner

*Primary Examiner* — Sana A Al-Hashemi
(74) *Attorney, Agent, or Firm* — Ryan, Mason & Lewis, LLP

(57) ABSTRACT

A method includes detecting a plurality of events associated assets of an enterprise system and generating database record structures based on the detected events, each database record structure comprising a first field storing an association key identifying one of the assets, a second field storing a first timestamp associated with a first detected event stored in that database record structure for its identified asset, and at least a third field storing a value associated with a second detected event stored in that database record structure for its identified asset. The method also includes maintaining indexing structures for the first, second and third fields, receiving a query to resolve a temporal association for a queried assets at a specified time, and utilizing the indexing structures to locate a particular one of the database record structures storing the temporal association for the queried asset at the specified time.

20 Claims, 11 Drawing Sheets

| TIME | EVENT | PRESIDENT | PLACE |
|---|---|---|---|
| 1732 | BORN | GWASHINGTON | VA |
| 1735 | BORN | JADAMS | MA |
| 1743 | BORN | TJEFFERSON | VA |
| 1789 | START-TERM | GWASHINGTON | WH |
| 1797 | END-TERM | GWASHINGTON | WH |
| 1797 | START-TERM | JADAMS | WH |
| 1799 | DIED | GWASHINGTON | VA |
| 1801 | END-TERM | JADAMS | WH |
| 1801 | START-TERM | TJEFFERSON | WH |
| 1809 | END-TERM | TJEFFERSON | WH |
| ... | ... | ... | ... |

Algorithm 1 Resolve Temporal Associations

1: function RESOLVE(*record, time*)
2:     $A \leftarrow \{v : v \in record.previous\}$
3:     for $m \in record.modifications.filter\{m : m.time \leq time\}$ do
4:       if $m.type == $ ASSOCIATE then
5:         $A \leftarrow A \cup \{m.value\}$
6:       else
7:         $A \leftarrow A - \{m.value\}$
8:       end if
9:     end for
10:    return $A$
11: end function

FIG. 5

Algorithm 2 Record Temporal Association Events

1: function RECORD(*event*)
2:   *record* ← *store.find*(*key* ≡ *event.key* ∧ *count* < *count*$_{max}$)
3:   if *record* ≡ *nil* then
4:     *record* ← *new*(*event.time*)
5:   end if
6:   *record.count* ← *record.count* + 1
7:   *record.first* ← *min*(*record.first*, *event.time*)
8:   *record.modifications* ← *record.modifications* ∪ {*event*}
9:   if *record.count* ≡ *count*$_{max}$ then
10:    *record.last* ← *max*({*e.time* : *e* ∈ *record.modifications*})
11:    *fresh* ← *new*(*record.last*)
12:    *fresh.previous* ← *resolve*(*record*, *record.last*)
13:    *store.save*(*fresh*)
14:  end if
15:  *store.save*(*record*)
16: end function
17: function NEW(*time*)
18:   *r* ← *new*(*record*)
19:   *r.last* ← ∞
20:   *r.count* ← 0
21:   *r.first* ← *time*
22:   *record.previous* ← { }
23:   return *r*
24: end function

FIG. 6

MAINTAINING TEMPORAL ASSOCIATIONS FOR EVENT DATA IN AN EVENT DATABASE

FIELD

The field relates generally to information processing, and more particularly to managing data in information processing systems.

BACKGROUND

Various information processing systems provide capabilities for searching and retrieving stored data. In an event database, for example, assets may be associated with different events or other characteristics over time. In such cases, it may be desired to provide query functionality to resolve the temporal association of a particular asset with a particular event or other characteristic. As the amount of data being stored increases, so does the amount of storage and other computing resources required for resolving or otherwise executing such queries of stored data.

SUMMARY

Illustrative embodiments of the present disclosure provide techniques for maintaining temporal associations for event data in data record structures. Advantageously, the temporal associations in the data record structures enable efficient query processing.

In one embodiment, a method comprises detecting a plurality of events, each of the events being associated with one of a plurality of assets of an enterprise system. The method also comprises generating a plurality of database record structures based at least in part on the detected events, each of the database record structures comprising a first field storing an association key identifying one of the plurality of assets, a second field storing a first timestamp associated with a first detected event stored in that database record structure for its identified asset, and at least a third field storing a value associated with a second detected event stored in that database record structure for its identified asset. The method further comprises maintaining indexing structures for at least the first field, the second field and the third field of the plurality of database record structures, receiving a query to resolve a temporal association for a queried one of the plurality of assets at a specified time, and utilizing the indexing structures to locate a particular one of the plurality of database record structures storing the temporal association for the queried asset at the specified time. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIG. 3 shows a table of event data in an illustrative embodiment.

FIG. 5 shows psuedocode of an algorithm for resolving temporal associations in an illustrative embodiment.

FIG. 6 shows psuedocode of an algorithm for recording temporal association events in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
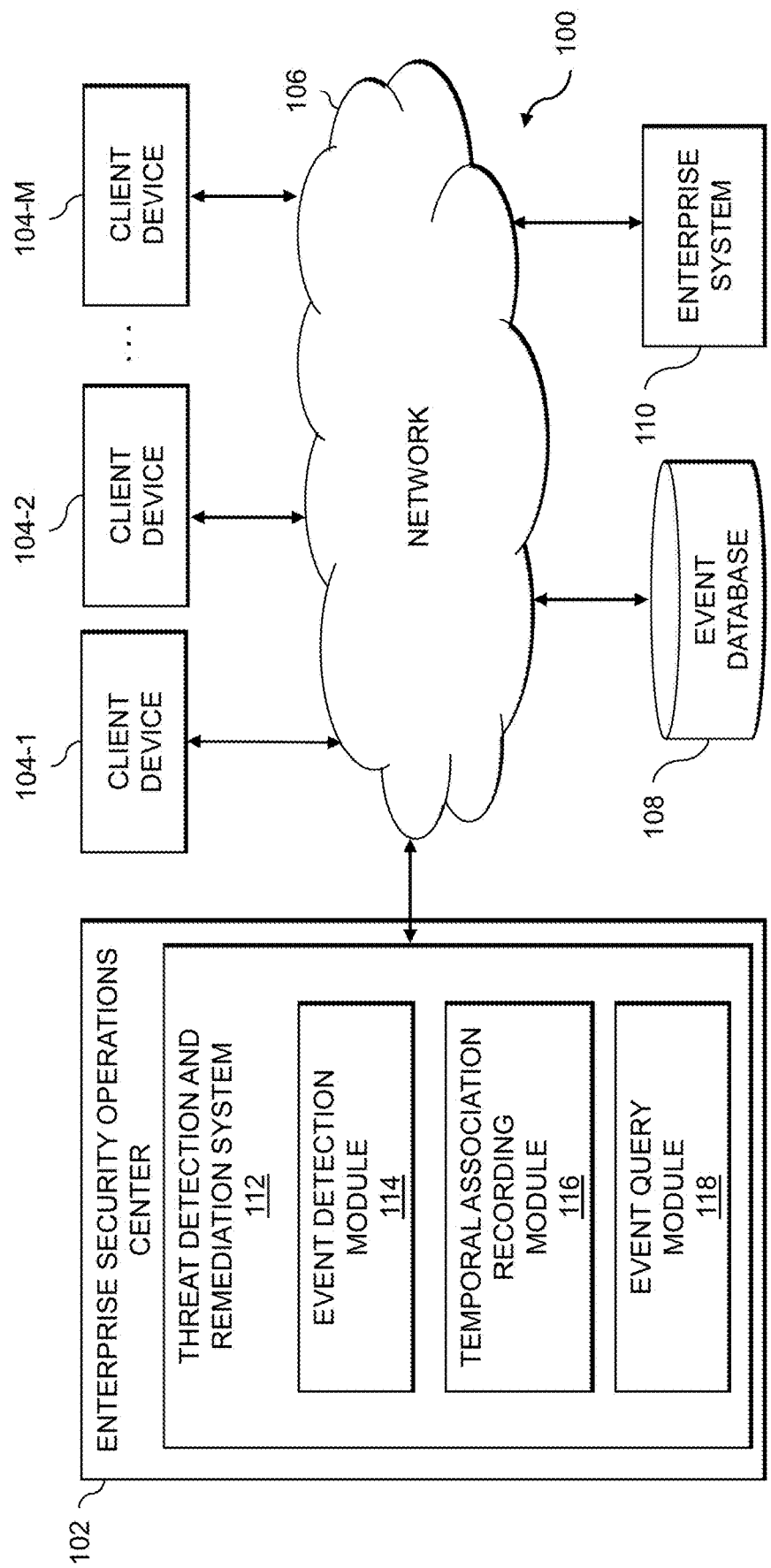
FIG. 1 is a block diagram of an information processing system for generating temporal associations for event data in an illustrative embodiment.

FIG. 1 shows an information processing system 100 configured in accordance with an illustrative embodiment. The information processing system 100 is assumed to be built on at least one processing platform and provides functionality for maintaining temporal associations for event data. The system 100 includes an enterprise security operations center (SOC) 102, which is assumed to monitor an enterprise system 110 accessed by a plurality of client devices 104-1, 104-2, ... 104-M (collectively, client devices 104). The enterprise SOC 102, client devices 104 and enterprise system 110 are coupled to a network 106. Also coupled to the network 106 is an event database 108, which may store various information relating to events associated with assets in the enterprise system 110. The assets in the enterprise system 110 may include physical computing resources, virtual computing resources, or combinations thereof. The virtual computing resources may include virtual machines (VMs), software containers, etc.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternatively comprise virtualized computing resources, such as VMs, software containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The event database 108, as discussed above, is configured to store and record information relating to events associated with assets in the enterprise system 110. Such information may include, but is not limited to, temporal associations stored efficiently in data record structures as described in further detail below.

The event database 108 in some embodiments is implemented using one or more storage systems or devices associated with the enterprise SOC 102. In some embodiments, one or more of the storage systems utilized to implement the event database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102 or components thereof such as threat detection and remediation system 112, as well as to support communication between the enterprise SOC 102, the threat detection and remediation system 112 and other related systems and devices not explicitly shown.

In some embodiments, the client devices 104 may implement host agents that are configured for communication with the threat detection and remediation system 112. Alerts or notifications generated by the threat detection and remediation system 112 of the enterprise SOC 102 are provided over network 106 to the client devices 104 via the host agents. The host agents are assumed to be implemented via the client devices 104, which may comprise computing or processing devices associated with or operated by a system administrator, IT manager or other authorized personnel of the enterprise system 110. For example, a given host agent may comprise a mobile telephone equipped with a mobile application configured to receive alerts from the enterprise SOC 102 or the threat detection and remediation system 112 and to provide an interface for the host agent to select particular remedial measures for responding to the alert or notification. Examples of such remedial measures may include blocking access by one or more of the client devices 104 to the enterprise system 110 or assets thereof, requiring user input or authentication by the client devices 104 to obtain information from or otherwise utilize one or more assets of the enterprise system 110, triggering further review of the enterprise system 110 or assets thereof, etc. Remedial measures may also include detecting and correcting (e.g., by modifying a configuration thereof) one or more malfunctioning assets (e.g., due to security threats affecting such assets, misconfiguration of such assets, etc.). The remedial measures may further include identifying other assets in the enterprise system 110 that may be subject to similar malfunctioning (e.g., due to the same security threat or misconfiguration, due to dependencies between assets, etc.) and appropriately altering configurations thereof.

It should be noted that a "host agent" as this term is generally used herein may comprise an automated entity, such as a software entity running on a processing device. Accordingly, a security agent or host agent need not be a human entity.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises an event detection module 114, a temporal association recording module 116 and an event query module 118.

The event module 114 is configured to detect events associated with the assets of the enterprise system 110. The events may associate or disassociate assets of the enterprise system 110 with values. For example, an asset may be a computing device of the enterprise system 110, and the detected events may include login and logout events for the computing device. The login events associate users with the computing device, and the logout events disassociate users with the computing device. As another example, an asset may be an Internet Protocol (IP) address allocated for use by the enterprise system 110, and the detected events may include Dynamic Host Configuration Protocol (DHCP) lease assignments. The DHCP lease assignments may associate or disassociate the IP address with a computing device of the enterprise system.

The temporal association recording module 116 is configured to generate a plurality of database record structures based at least in part on the detected events. Each of the database record structures may comprise: a first field storing an association key identifying one of the plurality of assets; a second field storing a first timestamp associated with an earliest detected event stored in that database record structure for its identified asset; and a third field storing a value associated with a second detected event stored in that database record structure for its identified asset. The value stored in the third field may comprise a predetermined value indicating an open database record structure, or a timestamp associated with a most recent event stored in that database record structure for its identified asset to indicate a closed database record structure. In some embodiments, each of the database record structures further comprises: a fourth field storing a set of resolved values for its identified asset from a closed database record structure for its identified asset; a fifth field storing modifications to temporal associations of its identified asset; and a sixth field storing a modification count specifying a number of modifications to the temporal association of its identified asset stored in that database record structure. Each of the detected events associates or disassociates one of the plurality of assets with one or more values, and the fifth field of each of the plurality of database record structures stores modifications to the temporal associations of its identified asset by recording association and disassociation of its identified asset with the one or more values.

It should be appreciated that the term "field" is intended to be construed broadly. Each database record may correspond to a row with each of the above-described first through sixth fields being its own column in that row. In some embodiments, one or more of the first through sixth fields may itself be part of a larger field (e.g., one or more of the first through sixth fields may be combined with other information as part of a larger field, or two or more of the first through sixth fields may be merged or combined as a single field, possible with other information). Each of the first through sixth fields may correspond to a set of designated bit positions or other designated locations within a larger field or other data structure.

The event query module 118 is configured to maintain indexing structures for at least the first field, the second field and the third field of the plurality of database record structures. The event query module 118 is also configured to receive queries to resolve temporal associations. For example, the event query module 118 may receive a query to resolve a temporal association for a queried one of the plurality of assets at a specified time and utilize the indexing structures to locate a particular one (e.g., a single one) of the plurality of database record structures storing the temporal association for the queried asset at the specified time.

It is to be appreciated that the particular arrangement of the enterprise SOC 102, the threat detection and remediation system 112, the event detection module 114, the temporal association recording module 116 and the event query module 118 illustrated in the FIG. 1 embodiment is presented by way of example only, and alternative arrangements can be used in other embodiments. As discussed above, for example, one or more of the enterprise SOC 102, the threat detection and remediation system 112, the event detection module 114, the temporal association recording module 116 and the event query module 118 may in some embodiments be implemented internal to one or more of the client devices 104. As another example, the functionality associated with the event detection module 114, the temporal association recording module 116 and the event query module 118 may be combined into one module, or separated across more than three modules with the multiple modules possibly being implemented with multiple distinct processors or processing devices.

At least portions of the event detection module 114, the temporal association recording module 116 and the event query module 118 may be implemented at least in part in the form of software that is stored in memory and executed by a processor.

It is to be understood that the particular set of elements shown in FIG. 1 for maintaining temporal associations for event data is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to the enterprise SOC 102, such that the enterprise SOC 102 can be eliminated.

The enterprise SOC 102, including the threat detection and remediation system 112, and other portions of the system 100 may be part of cloud infrastructure as will be described in further detail below.

The threat detection and remediation system 112 and other components of the enterprise SOC 102 and information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 104 and the enterprise SOC 102 or components thereof (e.g., the threat detection and remediation system 112, the event detection module 114, the temporal association recording module 116 and the event query module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise SOC 102, client devices 104 and the event database 108, or portions or components thereof, to reside in different data centers. Numerous other distributed implementations are possible. The enterprise SOC 102, or portions thereof such as the threat detection and remediation system 112 can also be implemented in a distributed manner across multiple data centers.

Additional examples of processing platforms utilized to implement the threat detection and remediation system 112 and other portions of the system 100 in illustrative embodiments will be described in more detail below in conjunction with FIGS. 8 and 9.

It is to be appreciated that these and other features of illustrative embodiments are presented by way of example only, and should not be construed as limiting in any way.

An exemplary process for maintaining temporal associations for event data will now be described in more detail with reference to the flow diagram of FIG. 2. It is to be understood that this particular process is only an example, and that additional or alternative processes for maintaining temporal associations for event data may be performed.

In this embodiment, the process includes steps 200 through 208. These steps are assumed to be performed by the threat detection and remediation system 112 utilizing the event detection module 114, the temporal association recording module 116 and the event query module 118. The process begins with step 200, detecting a plurality of events, each of the events being associated with one of a plurality of assets of an enterprise system.

In step 202, a plurality of database record structures are generated based at least in part on the detected events. Each of the database record structures may comprise: a first field storing an association key identifying one of the plurality of assets; a second field storing a first timestamp associated with an earliest detected event stored in that database record structure for its identified asset; and a third field storing a value associated with a second detected event stored in that database record structure for its identified asset. The value stored in the third field may comprise a predetermined value indicating an open database record structure, or a timestamp associated with a most recent event stored in that database record structure for its identified asset to indicate a closed database record structure. In some embodiments, each of the database record structures further comprises: a fourth field storing a set of resolved values for its identified asset from a closed database record structure for its identified asset; a fifth field storing modifications to temporal associations of its identified asset; and a sixth field storing a modification count specifying a number of modifications to the temporal association of its identified asset stored in that database record structure. Each of the detected events associates or disassociates one of the plurality of assets with one or more values, and the fifth field of each of the plurality of database record structures stores modifications to the temporal associations of its identified asset by recording association and disassociation of its identified asset with the one or more values.

Step 202 may include detecting a given event associated with a given asset and determining whether an open database record structure exists for the given asset. Responsive to determining that the open database record structure exists, step 202 may include modifying the open database record structure. Responsive to determining that no open database record structure exists for the given asset, step 202 may include creating a new database record structure for the given asset. An open database record structure for the given asset comprises a given database record structure having: a value in its first field matching a given association key identifying the given asset; and a value in at least one additional field comprising a modification count indicating that a number of association modifications stored in the given database record structure is below a designated threshold number of modifications. Modifying the open database record structure comprises appending the given event in the at least one additional field of the open database record structure, and incrementing the modification count in the at least one additional field of the open database record structure. Modifying the open database record structure may further comprise determining whether the incremented modification count in the at least one additional field of the open database record structure is equal to a designated threshold number of modifications and, responsive to determining that the incremented modification count in the at least one additional field of the open database record structure is equal to the designated threshold number of modifications, closing the open database record structure by updating the third field of the open database record structure from the predetermined value indicating an open database record structure to a given timestamp associated with the given event and creating a new open database record structure.

Creating the new database record structure comprises populating the first field of the new database record structure with the given association key, populating the second field of the new database record structure with a timestamp of the given event, populating the third field of the new database record structure with the predetermined value indicating an open database record structure, populating at least one additional field of the new database record structure with an association or disassociation corresponding to the given event, and incrementing a modification count of the new database record structure, the modification count indicating a number of association modifications stored in the at least one additional field in the given database record structure. Creating the new database record structure may further comprise, responsive to determining that a closed database record structure exists for the given asset, populating the at least one additional field of the new database record structure with at least one previously resolved association for the given asset from the closed database record structure for the given asset.

Figure 2:
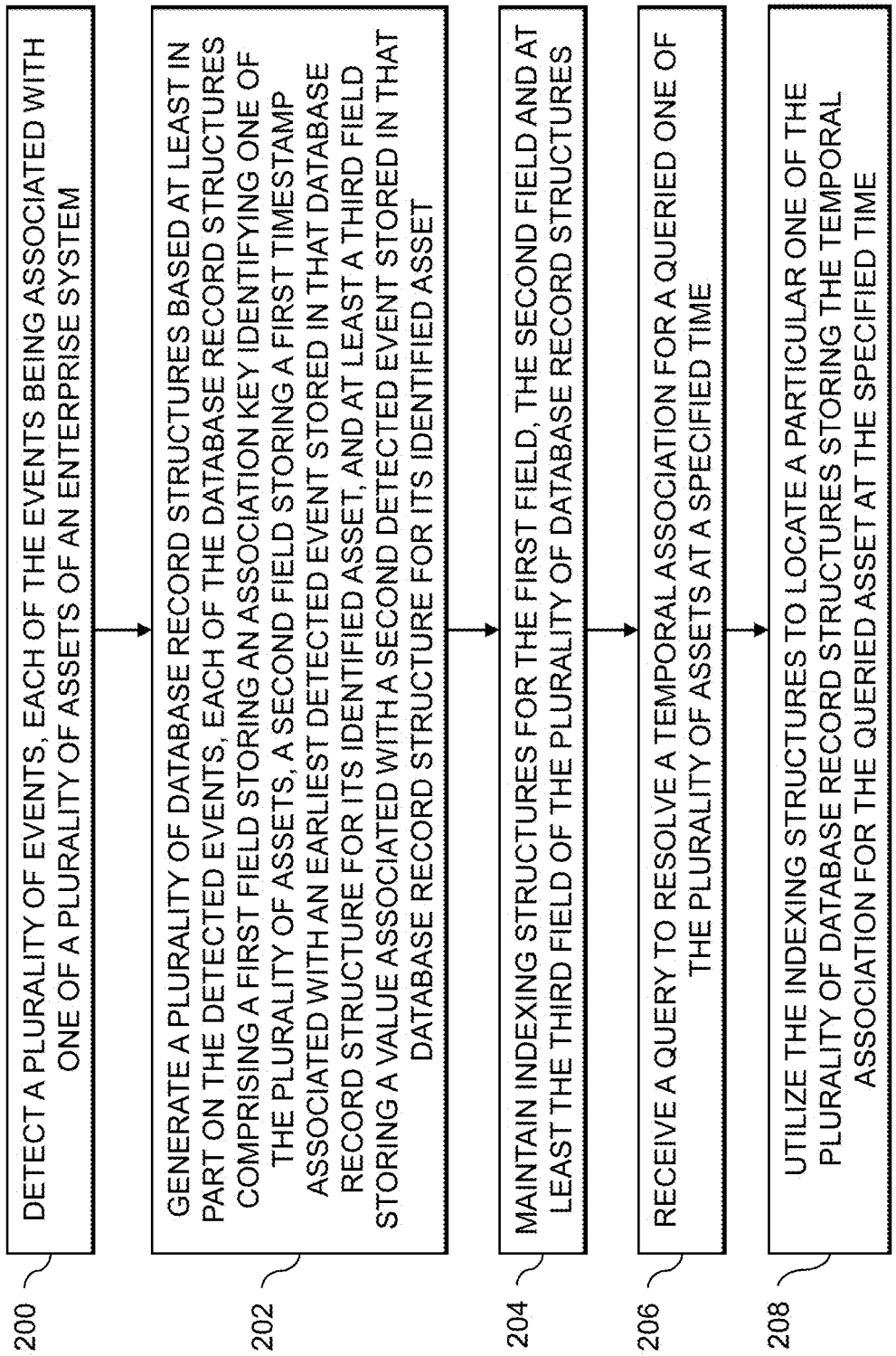
FIG. 2 is a flow diagram of an exemplary process for generating temporal associations for event data in an illustrative embodiment.

The FIG. 2 process continues with maintaining indexing structures for at least the first field, the second field and the third field of the plurality of database record structures in step 204. In step 206, a query to resolve a temporal association for a queried one of the plurality of assets at a specified time is received. In some embodiments, the queried asset comprises a computing device, the events comprise one or more login and logout events for the computing device, and the query may comprise determining a user logged in to the computing device at the specified time. In other embodiments, the queried asset comprises an IP address, the events comprise DHCP lease assignments, and wherein the query comprises determining a computing device assigned the IP address at the specified time.

In step 208, the indexing structures are utilized to locate a particular one of the plurality of database record structures storing the temporal association for the queried asset at the specified time. Step 208 may include utilizing the indexing structure maintained for the first field to identify a set of database record structures having a value in the first field identifying the queried asset, the identified set of database record structures comprising an open database record structure and one or more closed database record structures, and utilizing the indexing structures maintained for the second field and the third field to identify a given database record structure storing the temporal association for the queried asset at the specified time from the identified set of database record structures.

As described above, illustrative embodiments provide techniques for generating and maintaining temporal associations for event data. Consider the problem of building associations from events collected over a period of time. For example, the enterprise SOC 102 and/or threat detection and remediation system 112 of FIG. 1 may be configured to monitor user login and logout events (e.g., users of client devices 104 logging into and out of assets of the enterprise system 110). Such login and logout events may associate host names of the assets in the enterprise system 110 with IP addresses of the client devices 104. The utility of such associations for security analysis is evident, such as in determining which user was logged onto a system when a security event occurs (e.g., infection by malware or adware, etc.). There is a need for techniques for efficient storage of temporal associations in database structures (e.g., event database 108 of FIG. 1). Of course, it should be appreciated that temporal associations are not limited to use with tracking login and logout events for assets of enterprise system 110. In other embodiments, for example, temporal associations may be utilized to track DHCP lease assignments or other types of events associated with the assets of the enterprise system 110.

Without loss of generality, the problem of creating and maintaining temporal associations for event data may be considered with respect to the problem of linking U.S. presidents with places they were associated with during their lifetimes. This reduction gives a concrete dataset for reasoning and prototyping temporal associations. FIG. 3 shows a table 300, illustrating a portion of a database storing such events associated with U.S. presidents. Each row in table 300 records a significant event in the life of a U.S. president. Each row includes a timestamp (in the FIG. 3 example, at year precision) and event code (e.g., born, died, start-term, end-term) that updates that president's association with a place (e.g., two-letter state codes for the birth and death states, and WH representing White House). For example, the first row in table 300 records the birth of George Washington, where George Washington is associated with Virginia (VA) in 1732. This association remains until there is a died event for George Washington in 1799.

With the trail of events shown in table 300, two associations can be built: President→Place, and Place→President. Given this, various queries may be answered. For example, the query may be to identify the places that George Washington was associated with at various times, such as: in 1750—{VA}; in 1790—{VA, WH}; in 1798—{VA}; and in 2019—{ }. The query may alternatively be to determine who was associated with a particular place, such as VA, at a particular time, such as 1790—{George Washington, Thomas Jefferson, . . . } (e.g., where " . . . " represents all other U.S. presidents born in VA and alive in 1790 not shown in table 300). The query may also be to determine who was associated with the White House at a particular time, such as in 1800—{John Adams}. Various other types of queries are possible. A system that can answer these queries efficiently should also be able to build temporal associations (e.g., user login/logout, DHCP lease assignments, etc.) useful for analyzing and remediating security events for enterprise system 110. In some embodiments, it is desired that answering or resolving a query requires only a single look-up read.

To start, the problem of generating temporal associations is modeled by generalizing actions (e.g., login, logout, born, died, start-term, end-term, etc.) to events of the following type:

```
enum Type {
    ASSOCIATE,
    DISASSOCIATE
}
```

That is, for the purpose of association building, an "interesting" event (e.g., one which is to be tracked via temporal associations) either makes an association or breaks an association. With the event type generalized, the event itself may be generalized as:

```
class Event<V> {
    Instant time;
    Type type;
    String key;
    V value;
}
```

Given the above, events in table 300 can be modeled as follows:
Event(time: 1732, type: ASSOCIATE, key: 'gwashington', value: 'VA') #born
Event(time: 1797, type: DISASSOCIATE, key: 'gwashington', value: 'WH') #end-term Similarly, login and logout events can be modeled as follows:
Event(time: 1559256666, type: ASSOCIATE, key: 'username', value: 'server address')
Event(time: 1559256739, type: DISASSOCIATE, key: 'username', value 'server address')

With the events modeled, an efficient interface may be modeled as:

```
public interface AssociationService<V> {
    /* Record an observed association event */
    void record(Event(V) event);
    /* Get the values associated with a given key for a given time */
    Set(V) getAssociations(String key, Instant time);
}
```

These interfaces enable a Test-Driven Development (TDD) specification that can be iterated over to evaluate prototypes as follows:

```
when:
presidentialEvents( ).forEach {
    service.record(new Event(forYear(it.year), it.type, it,name, it.place))
}
then:
service.getAssociations('gwashington', forYear(1750)) == ['VA'] as Set
service.getAssociations('gwashington', forYear(1790)) == ['VA', 'WH'] as Set
service.getAssociations('gwashington', forYear(1798)) == ['VA'] as Set
service.getAssociations('gwashington', forYear(2019)) == [ ] as Set
```

Given the above, some embodiments build a partially-persistent structure. An ordinary data structure is ephemeral, in that making changes to the data structure overwrites any previous versions. In some cases, however, it is desired to maintain multiple versions of the data structure. As used herein, a data structure is considered partially persistent if multiple versions of the data structure may be accessed (e.g., a current version and one or more previous versions), though it is assumed that only the current or newest version of the data structure may be modified. A data structure is considered fully persistent if multiple versions (e.g., a current version and one or more previous versions) may be both accessed and modified.

Various techniques may be used to implement both partially and fully persistent data structures. A need exists, however, for techniques that translate such methods for linked data structures to commodity databases that may be required for a particular implementation. Illustrative embodiments utilize the data record structure 400 shown in FIG. 4. The data record structure 400 includes an association key, a first time stamp (e.g., min(t)) a last time stamp (e.g., max($t_1$) or ∞), one or more previous or resolved values from previous records for the association key (e.g., $V_{-1}$, $V_0$), a modifications box of a fixed size that stores association modification events (e.g., $t_1$-$V_1$, $t_2$-$V_2$, $t_3$-$V_3$), and a current count of modification events stored in the data record structure. Each data record structure retains associations in the time range [first, last) for a given key value. The count, in some embodiments, is a bounded number of modification events. The count field may have an associated maximum value (e.g., count$_{max}$) that determines when a data record structure is split as described in further detail below. The count$_{max}$ value is a tuning parameter, which can be used to prevent the modifications field of the data record structure 400 from growing unbounded. The count$_{max}$ value may also be used in facilitating automated cleanup of records, use the last timestamp to automatically delete records. In some embodiments, the database storing the data record structures (e.g., event database 108 in FIG. 1) indexes on the "last" value to make cleanup easier.

Figure 4:
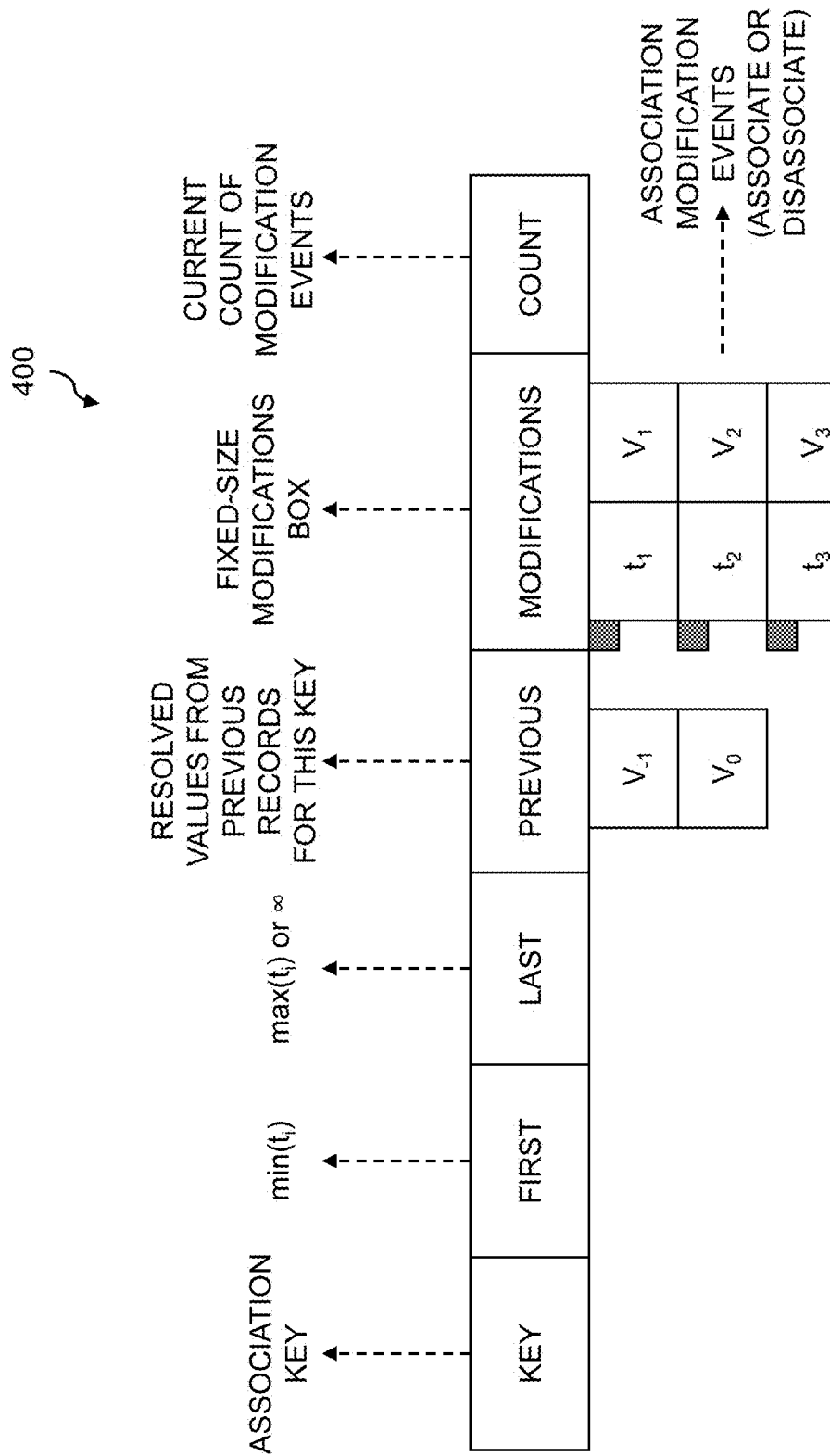
FIG. 4 shows an event record structure in an illustrative embodiment.

Given a data record structure such as the structure 400 shown in FIG. 4, the associations that apply at a given time can be resolved using the algorithm 500 shown in FIG. 5. The filter {r: rkey=key)/\(r.first≤time<r.last)} returns the record needed to resolve a getAssociations(key, time) response. With indices on key, first and last fields, a database can furnish matching records efficiently.

In some embodiments, a node copying scheme for linked data structures is extended to documents in commodity databases. The algorithm 600 shown in FIG. 6 provides pseudocode for recording temporal association events. The algorithm 600 makes use of a "new" command described below, as well as the "resolve" command described above. As noted above, the algorithm 600 supports the use of a configurable limit count$_{max}$ for the maximum modifications allowed in a single data record structure. When an event is received, it is added to its applicable open record (e.g., key=event.key /\count<count$_{max}$). If this update brings the count up to the limit, the record is closed and a fresh one is started with its previous value set to the resolved value of the association as per the current record.

For a carefully chosen value of count$_{max}$, most updates should take a single read and write. Most commodity databases support "upserts" which can reduce the number of network exchanges to one. For example, a single findOneAndUpdate call may be used to record the majority of events as follows:

```
//Encode the event as a modification
Document mod = new Document(TIME, event.time) .append(VALUE,
event.value);
mod.append(TYPE, event.type == ASSOCIATE(;
//Update (or insert) the record to register this modification
collection.findOneAndUpdate(and(eq(KEY, event.key),
lt(MOD_COUNT, maxModifications)),
    combine(inc(MOD_COUNT, 1), min(FIRST_TIME, event.time),
    addToSet(MODIFICATIONS, mod)), upsert);
```

When a record splits, an extra save is used to ensure future events do not go to the now closed record.

Once the modification count reaches the configured maximum, the record is closed (e.g., it will not be returned on line 2 in the RECORD routine described above). This closure is aligned with setting the last field in the record to the time of the last of its recorded modifications. Next, a new record is created for future events for the same key.

The new record sets its first field to the last field of the current record, and its previous field to the resolved association at that time. Eventually, when a new event arrives line 2 in the RECORD routine described above returns the new record and the event is recorded as a modification in it.

Figure 7A:
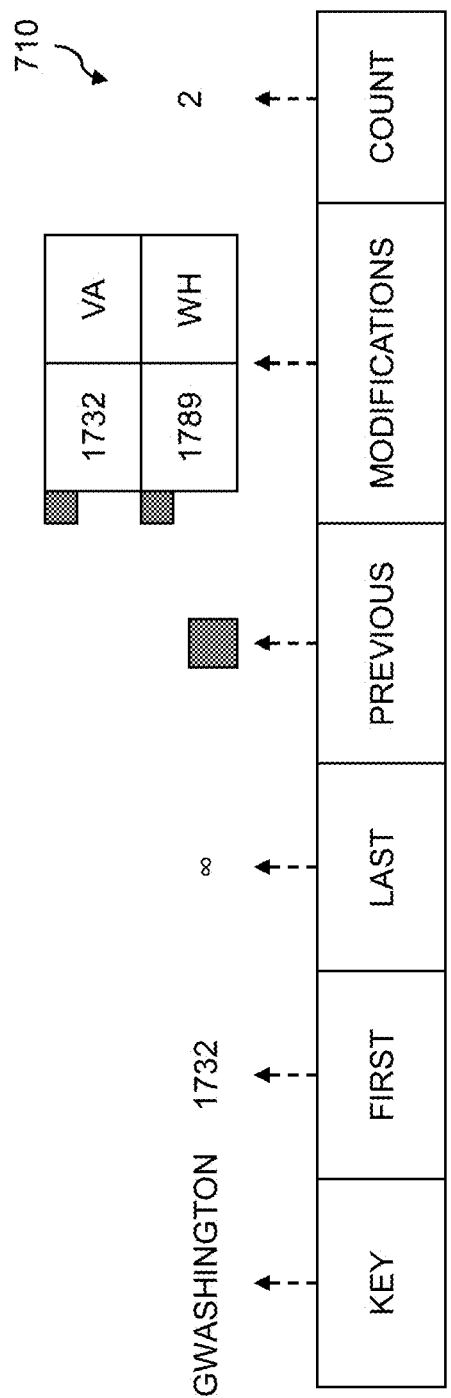
FIGS. 7A-7C illustrate creation of event record structures in an illustrative embodiment.
Figure 7B:
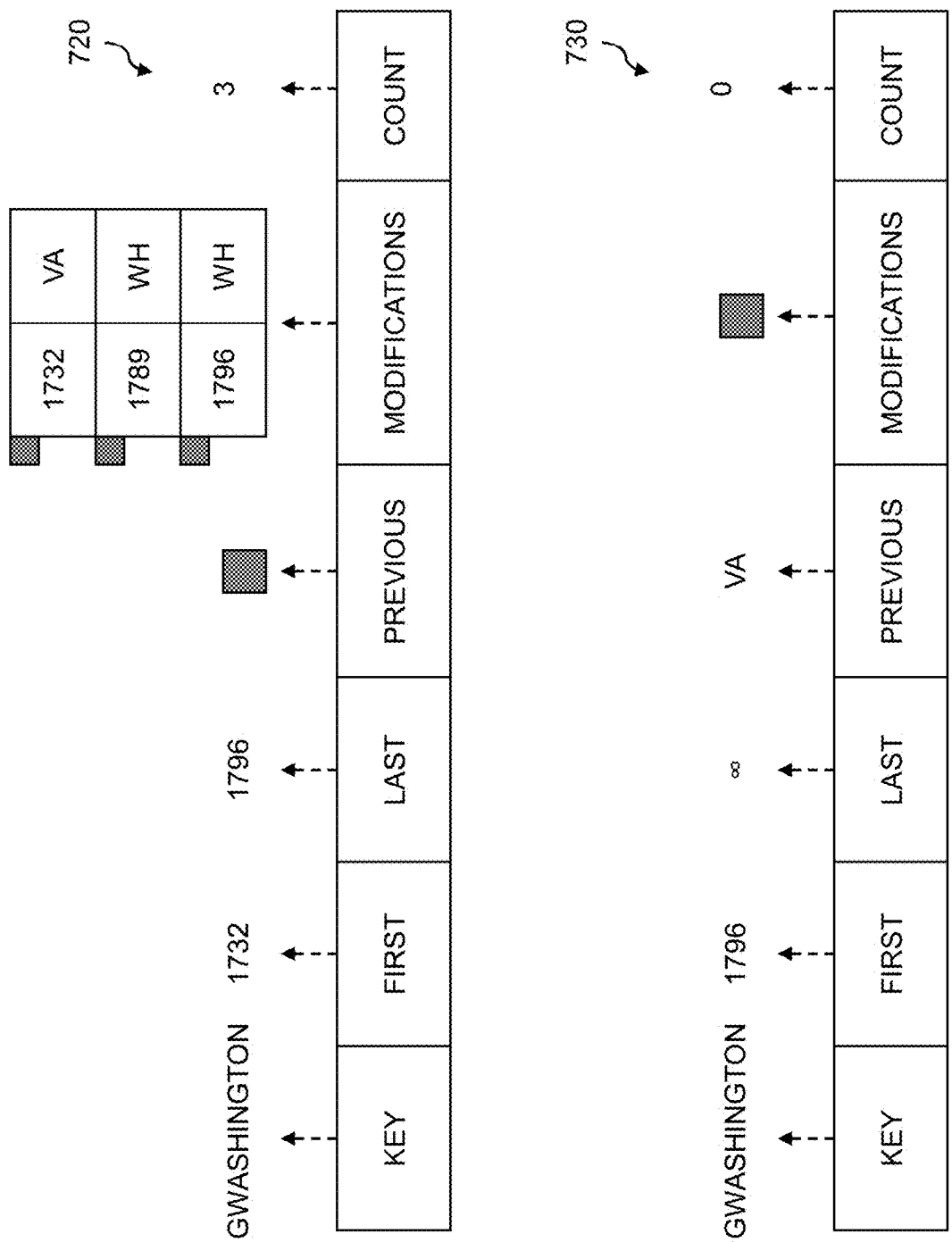
Figure 7C:
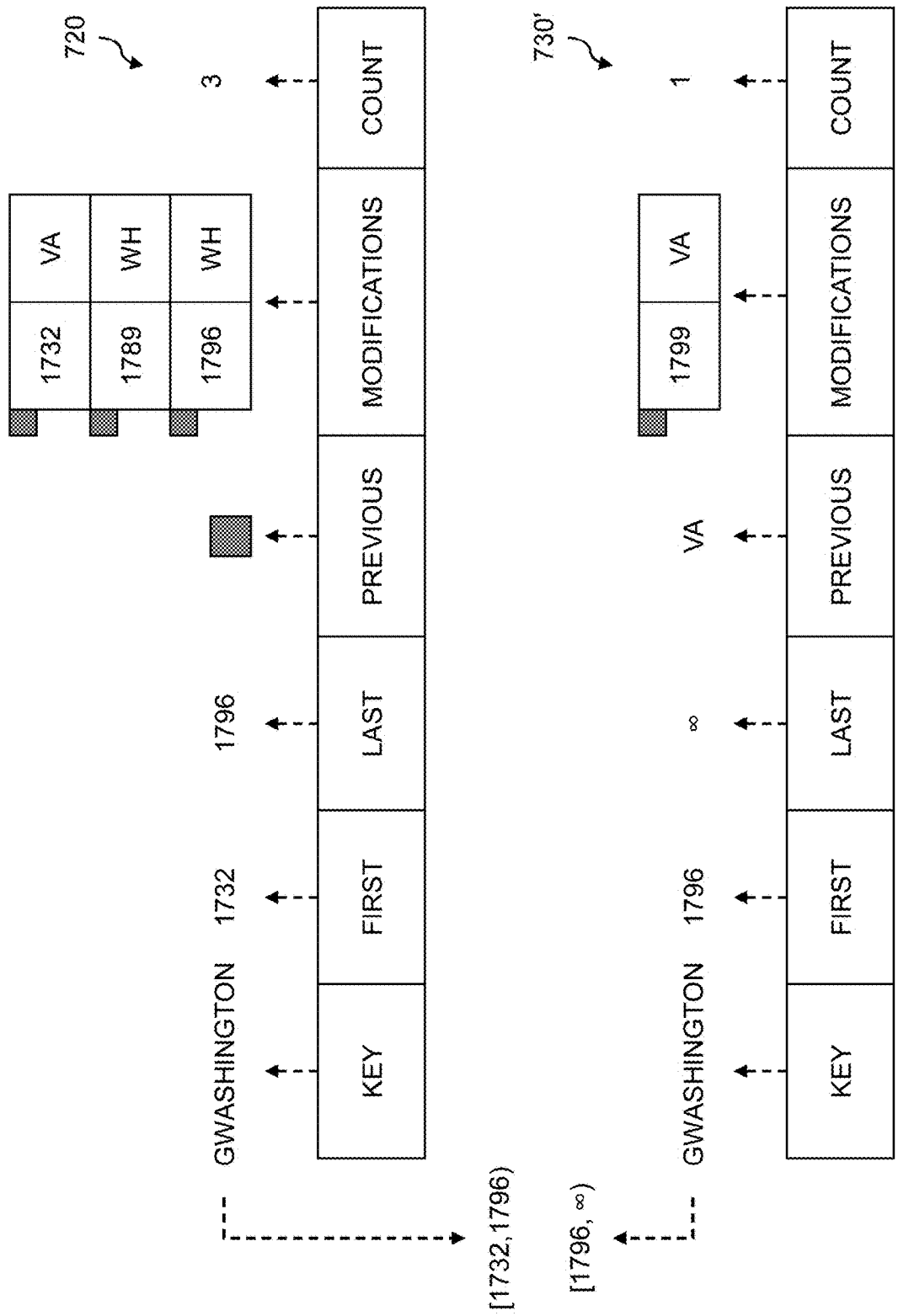

Concretely, with count$_{max}$=3, consider the process of recording the following events:
Event(time: 1732, type: ASSOCIATE, key: 'gwashington', value: 'VA') #born
Event(time: 1789, type: ASSOCIATE, key: 'gwashington', value: 'WH') #start-term
Event(time: 1796, type: DISASSOCIATE, key: 'gwashington', value: 'WH') #end-term
Event(time: 1799, type: DISASSOCIATE, key: 'gwashington', value: 'VA') #died The first event creates a new record for the key gwashington. The second is registered as a modification in that record. The third event is recorded as a modification as well, but it triggers a split. This is illustrated in FIGS. 7A and 7B. FIG. 7A shows the data record structure 710 after the first two events are entered into the record. FIG. 7B illustrates splitting the data record structure 710 into data record structures 720 and 730. More particularly, data record structure 710 shows the record for key gwashington after storing the first two events, data record structure 720 shows the third event for key gwashington closing the current record by setting the last time stamp to 1796 and opening a new data record structure 730 for future events, where the data record structure 730 has its previous field set to the resolved associations. FIG. 7C shows a subsequent update to the data record structure 730 for the fourth event. The closed record (e.g., data record structure 720) and the updated open record (e.g., data record structure 730') record associations for distinct time frames (e.g., [1732, 1796) and [1796, ∞), respectively). The value "∞" in the last field of a data record structure indicates an open database record structure.

In some embodiments, temporal associations are implemented by sharing a database instance that is used by a set of applications in a security information and event management (SIEM) system. In this context, the following runtime constraints apply: (i) disk usage should be minimized, (ii) automated record expiry should be supported, (iii) efficient write throughput and association lookups should be supported. A prototype implementation for this use case by a PartialPersistenceAssociation-Service. The implementation meets the functional requirements and is reasonably efficient. For example, with the following indexes:

```
IndexOptions ninetyDays = new IndexOptions(
).background(true).expireAfter(90L, DAYS);
IndexOptions background = new IndexOptions( ).background(true);
this.collection.createIndex(Indexes.ascending(KEY), background);
this.collection.createIndex(Indexes.ascending(LAST_TIME),
ninetyDays);
this.collection.createIndex(Indexes.ascending(FIRST_TIME),
background);
``` the associations queries can be serviced efficiently. Moreover, the semantics of the last field enable configuration of automated retention policies, where records are automatically dropped by the database when they are no longer relevant to the analyst.

The techniques described herein for generating and maintaining temporal associations for events are completely agnostic of the implementation choices (e.g., the particular type of database used) and can be easily ported to other environments (e.g., for a Software-as-a-Service (SaaS) implementation). For example, the record and query algorithms can be implemented as a completely server-less solution using cloud computing platforms.

The prototype includes a benchmark that records over a million randomly generated events and measures the throughput and disk footprint for the indices. Running the prototype on a consumer laptop with 1 thread synchronizing iterations, for 16,384 distinct keys, 8,192 distinct values and maximum modifications (e.g., count$_{max}$) set to 13, the benchmark achieves 3679.609±677.967 operations per second (ops/s) average, with minimum, average and maximum ops/s of U.S. Pat. Nos. 3,524,116, 3,679,609 and 3954.690 with a standard deviation of 176.066. The confidence interval (99.99%) is [3001.642, 4357.576], assuming a normal distribution.

Usable association events, in some embodiments, are assumed to be a very small subset of the overall stream of events so the rate achieved using the prototype implementation should be sufficient. Also, these numbers are for the simple implementation described above and do not account for optimizations such as multi-threaded implementations, asynchronous of buffered writes to the database, etc. The database footprint after recording more than a million events is as follows. There are 93,600 records with a total size of 65.9 megabytes (MB) and an average size of 738 bytes (B). Note that the number of records is less than one million as the $count_{max}$ is set to 13. There are four indexes (key, first and last values as described above, along with a database-specific record identifier index), with the total size of the indexes being 3.4 MB with an average size of 878 kilobytes (KB).

Illustrative embodiments provide techniques for maintaining temporal associations for event data. Advantageously, temporal associations are recorded in database records in a manner that permits efficient query, reducing the number of lookups required thus improving database performance. Further, by indexing key, first and last (or other user-defined fields) of the temporal associations maintained in the database records, query efficiency is further improved (e.g., in requiring that only a single database record be looked up for any particular query to a temporal association).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for maintaining temporal associations for event data will now be described in greater detail with reference to FIGS. 8 and 9. Although described in the context of system 100, these platforms may also be used to implement at least portions of other information processing systems in other embodiments.

Figure 8:
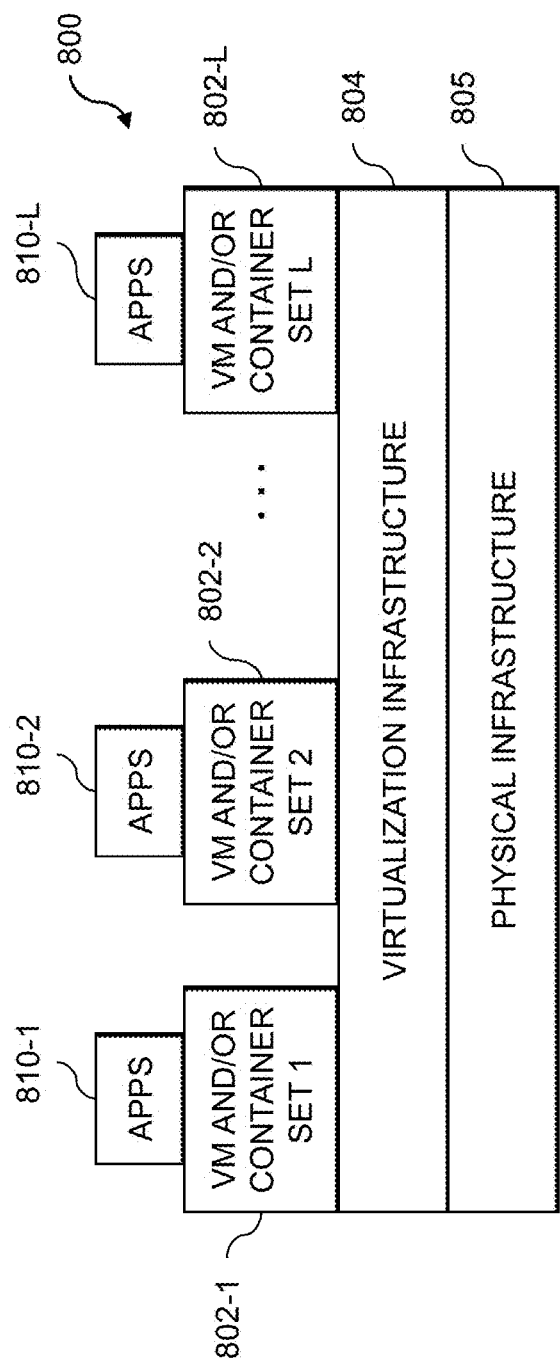
FIGS. 8 and 9 show examples of processing platforms that may be utilized to implement at least a portion of an information processing system in illustrative embodiments.
Figure 9:
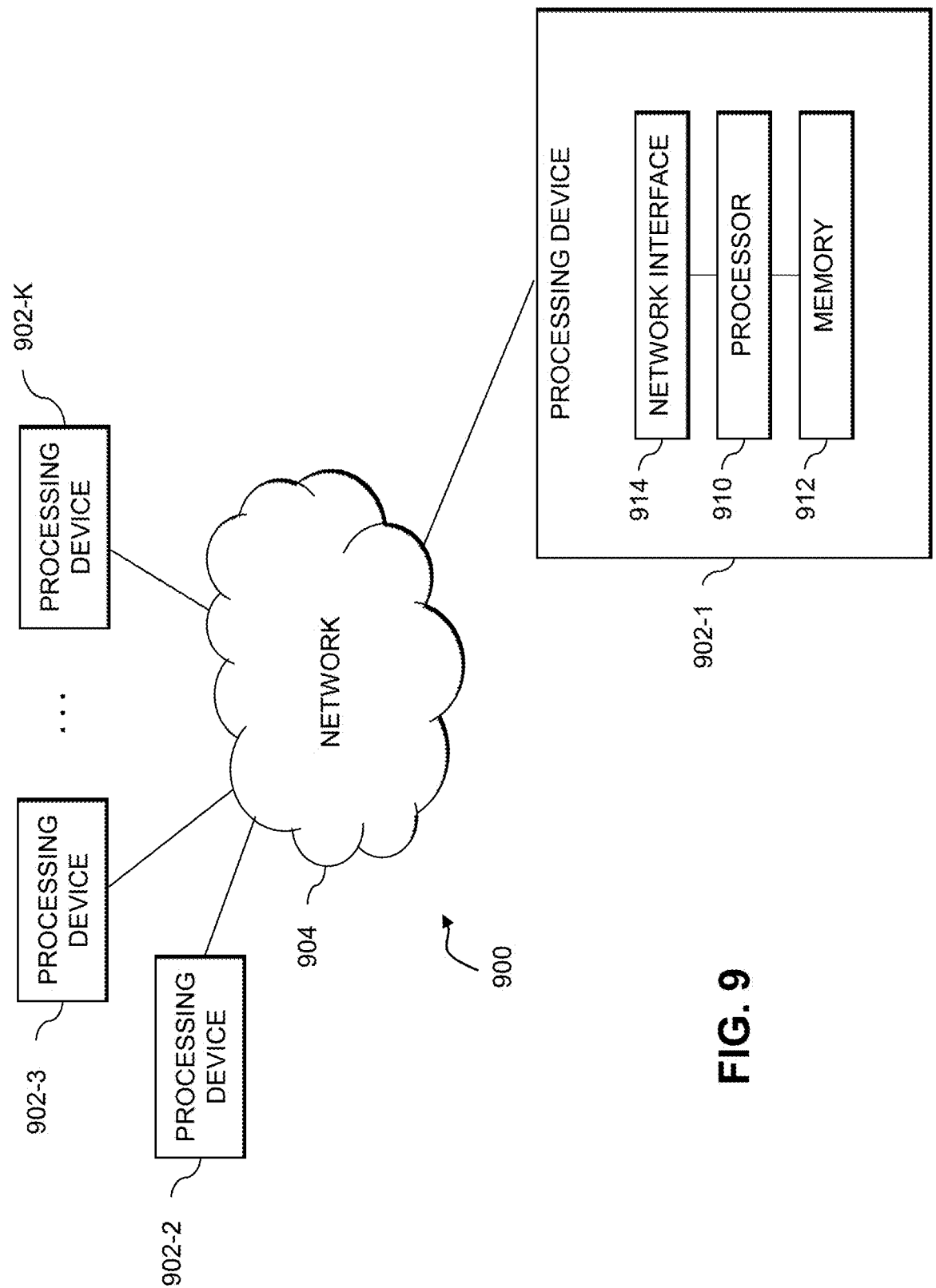

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for maintaining temporal associations for event data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, event types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
    detecting a plurality of events, each of the events being associated with one of a plurality of assets of an enterprise system;
    generating a plurality of database record structures based at least in part on the detected events, each of the database record structures comprising a first field storing an association key identifying one of the plurality of assets, a second field storing a first timestamp associated with a first detected event stored in that database record structure for its identified asset, and at least a third field storing a value associated with a second detected event stored in that database record structure for its identified asset;
    maintaining indexing structures for at least the first field, the second field and the third field of the plurality of database record structures;
    receiving a query to resolve a temporal association for a queried one of the plurality of assets at a specified time; and
    utilizing the indexing structures to locate a particular one of the plurality of database record structures storing the temporal association for the queried asset at the specified time;
    wherein each of at least a subset of the plurality of database record structures comprises one of:
        an open database record structure where the value stored in the third field comprises a predetermined value indicating that the database record structure is an open database record structure; and
        a closed database record structure where the value stored in the third field comprises a second timestamp associated with the second detected event;
    wherein the plurality of database record structures comprises two or more database record structures for a given one of the plurality of assets;
    wherein the two or more database record structures for the given one of the plurality of assets comprise at least one closed database record structure for the given one of the plurality of assets, and at least one open database record structure for the given one of the plurality of assets; and
    wherein the method is performed by at least one processing device comprising a processor coupled to a memory.

2. A computer program product comprising a non-transitory processor-readable storage medium having stored therein program code of one or more software programs, wherein the program code when executed by at least one processing device causes the at least one processing device to perform steps of:
    detecting a plurality of events, each of the events being associated with one of a plurality of assets of an enterprise system;
    generating a plurality of database record structures based at least in part on the detected events, each of the database record structures comprising a first field storing an association key identifying one of the plurality of assets, a second field storing a first timestamp associated with a first detected event stored in that database record structure for its identified asset, and at least a third field storing a value associated with a second detected event stored in that database record structure for its identified asset;
    maintaining indexing structures for at least the first field, the second field and the third field of the plurality of database record structures;
    receiving a query to resolve a temporal association for a queried one of the plurality of assets at a specified time; and
    utilizing the indexing structures to locate a particular one of the plurality of database record structures storing the temporal association for the queried asset at the specified time;
    wherein each of at least a subset of the plurality of database record structures comprises one of:
        an open database record structure where the value stored in the third field comprises a predetermined value indicating that the database record structure is an open database record structure; and
        a closed database record structure where the value stored in the third field comprises a second timestamp associated with the second detected event;
    wherein the plurality of database record structures comprises two or more database record structures for a given one of the plurality of assets; and
    wherein the two or more database record structures for the given one of the plurality of assets comprise at least one closed database record structure for the given one of the plurality of assets, and at least one open database record structure for the given one of the plurality of assets.

3. An apparatus comprising:
at least one processing device comprising a processor coupled to a memory;
the at least one processing device being configured to perform steps of:
  detecting a plurality of events, each of the events being associated with one of a plurality of assets of an enterprise system;
  generating a plurality of database record structures based at least in part on the detected events, each of the database record structures comprising a first field storing an association key identifying one of the plurality of assets, a second field storing a first timestamp associated with a first detected event stored in that database record structure for its identified asset, and at least a third field storing a value associated with a second detected event stored in that database record structure for its identified asset;
  maintaining indexing structures for at least the first field, the second field and the third field of the plurality of database record structures;
  receiving a query to resolve a temporal association for a queried one of the plurality of assets at a specified time; and
  utilizing the indexing structures to locate a particular one of the plurality of database record structures storing the temporal association for the queried asset at the specified time;
wherein each of at least a subset of the plurality of database record structures comprises one of:
  an open database record structure where the value stored in the third field comprises a predetermined value indicating that the database record structure is an open database record structure; and
  a closed database record structure where the value stored in the third field comprises a second timestamp associated with the second detected event;
wherein the plurality of database record structures comprises two or more database record structures for a given one of the plurality of assets; and
wherein the two or more database record structures for the given one of the plurality of assets comprise at least one closed database record structure for the given one of the plurality of assets, and at least one open database record structure for the given one of the plurality of assets.

4. The method of claim 1 wherein, in each of the plurality of database record structures, the first detected event comprises an earliest detected event stored in that database record structure for its identified asset and the second detected event comprises a most recent detected event stored in that database record structure for its identified asset.

5. The method of claim 1 wherein the queried asset comprises a computing device, the detected events comprise one or more login and logout events for the computing device, and the query comprises determining a user logged in to the computing device at the specified time.

6. The method of claim 1 wherein the queried asset comprises an Internet Protocol (IP) address, the detected events comprise Dynamic Host Configuration Protocol (DHCP) lease assignments, and the query comprises determining a computing device assigned the IP address at the specified time.

7. The method of claim 1 wherein at least one of the plurality of database record structures further comprises a fourth field storing a set of resolved values for its identified asset from at least one closed database record structure for its identified asset, a fifth field storing modifications to temporal associations of its identified asset maintained in said at least one database record structure, and a sixth field storing a modification count specifying a number of modifications to the temporal association of its identified asset maintained in said at least one database record structure.

8. The method of claim 1 wherein each of the detected events associates or disassociates one of the plurality of assets with one or more values, and at least one additional field of each of the plurality of database record structures stores modifications to the temporal associations of its identified asset by recording association and disassociation of its identified asset with the one or more values.

9. The method of claim 1 wherein generating the plurality of database record structures comprises:
  detecting a given event associated with least one of the plurality of assets;
  determining whether an open database record structure exists for said at least one of the plurality of assets;
  responsive to determining that the open database record structure exists, modifying the open database record structure; and
  responsive to determining that no open database record structure exists for said at least one of the plurality of assets, creating a new database record structure for said at least one of the plurality of assets.

10. The method of claim 1 wherein utilizing the indexing structures to locate the particular one of the plurality of database record structures storing the temporal association for the queried asset at the specified time comprises:
  utilizing the indexing structure maintained for the first field to identify a set of database record structures having a value in the first field identifying the queried asset, the identified set of database record structures comprising an open database record structure and one or more closed database record structures; and
  utilizing the indexing structures maintained for the second field and the third field to identify a given database record structure storing the temporal association for the queried asset at the specified time from the identified set of database record structures.

11. The computer program product of claim 2 wherein, in each of the plurality of database record structures, the first detected event comprises an earliest detected event stored in that database record structure for its identified asset and the second detected event comprises a most recent detected event stored in that database record structure for its identified asset.

12. The computer program product of claim 2 wherein at least one of the plurality of database record structures further comprises a fourth field storing a set of resolved values for its identified asset from at least one closed database record structure for its identified asset, a fifth field storing modifications to temporal associations of its identified asset maintained in said at least one database record structure, and a sixth field storing a modification count specifying a number of modifications to the temporal association of its identified asset maintained in said at least one database record structure.

13. The apparatus of claim 3 wherein, in each of the plurality of database record structures, the first detected event comprises an earliest detected event stored in that database record structure for its identified asset and the second detected event comprises a most recent detected event stored in that database record structure for its identified asset.

14. The apparatus of claim 3 wherein at least one of the plurality of database record structures further comprises a fourth field storing a set of resolved values for its identified asset from at least one closed database record structure for its identified asset, a fifth field storing modifications to temporal associations of its identified asset maintained in said at least one database record structure, and a sixth field storing a modification count specifying a number of modifications to the temporal association of its identified asset maintained in said at least one database record structure.

15. The apparatus of claim 3 wherein generating the plurality of database record structures comprises:
   detecting a given event associated with at least one of the plurality of assets;
   determining whether an open database record structure exists for said at least one of the plurality of assets;
   responsive to determining that the open database record structure exists, modifying the open database record structure; and
   responsive to determining that no open database record structure exists for said at least one of the plurality of assets, creating a new database record structure for said at least one of the plurality of assets.

16. The method of claim 9 wherein an open database record structure for said at least one of the plurality of assets comprises a given database record structure having:
   a value in its first field matching a given association key identifying said at least one of the plurality of assets; and
   a value in at least one additional field comprising a modification count indicating that a number of association modifications maintained in the given database record structure is below a designated threshold number of modifications.

17. The method of claim 9 wherein creating the new database record structure comprises:
   populating the first field of the new database record structure with the given association key;
   populating the second field of the new database record structure with a timestamp of the given event;
   populating the third field of the new database record structure with the predetermined value indicating an open database record structure;
   populating at least one additional field of the new database record structure with an association or disassociation corresponding to the given event; and
   incrementing a modification count of the new database record structure, the modification count indicating a number of association modifications stored in the at least one additional field in the new database record structure.

18. The method of claim 16 wherein modifying the open database record structure comprises appending the given event in the at least one additional field of the open database record structure and incrementing the modification count.

19. The method of claim 17 wherein creating the new database record structure further comprises, responsive to determining that a closed database record structure exists for said at least one of the plurality of assets, populating the at least one additional field of the new database record structure with at least one previously resolved association for said at least one of the plurality of assets from the closed database record structure for said at least one of the plurality of assets.

20. The method of claim 18 wherein modifying the open database record structure further comprises:
   determining whether the incremented modification count is equal to the designated threshold number of modifications; and
   responsive to determining that the incremented modification count is equal to the designated threshold number of modifications, closing the open database record structure by updating the third field of the open database record structure from the predetermined value indicating an open database record structure to a given timestamp associated with the given event.

* * * * *